(No Model.)

H. B. PLUMB.
CASTER.

No. 349,952. Patented Sept. 28, 1886.

WITNESSES:
James G. Clark
Chas. B. Shumway

INVENTOR
Henry B. Plumb
By Geo. D. Seymour
Atty

United States Patent Office.

HENRY B. PLUMB, OF TERRYVILLE, CONNECTICUT.

CASTER.

SPECIFICATION forming part of Letters Patent No. 349,952, dated September 28, 1886.

Application filed May 10, 1886. Serial No. 201,685. (No model.)

*To all whom it may concern:*

Be it known that I, HENRY B. PLUMB, residing at Terryville, in the county of Litchfield and State of Connecticut, have invented certain new and useful Improvements in Casters; and I do declare the following to be a full, clear, and exact description of the same, reference being had to the accompanying drawings, which form a part of this specification.

My invention relates to an improvement in casters, the object being to effect an economy in their construction and application.

With these ends in view my invention consists in a caster having a flexible shank adapted to engage throughout its length and under tension with the walls of the socket or hole receiving it, whereby it holds the caster in place and is prevented from turning.

My invention further consists in a caster having a flexible shank made of sheet metal and having straight sides.

My invention further consists in a caster having its shank and plate made in one piece of sheet metal.

My invention further consists in a caster having a flexible shank and a sheet-metal plate provided upon its upper face with points or projections turned up therefrom.

My invention further consists in certain details of construction, as will be hereinafter described, and pointed out in the claims.

Figure 1:
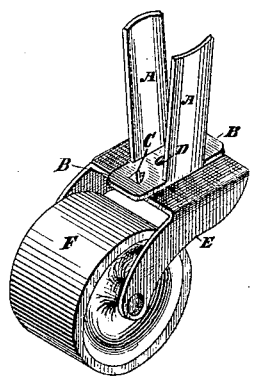
Figure 2:
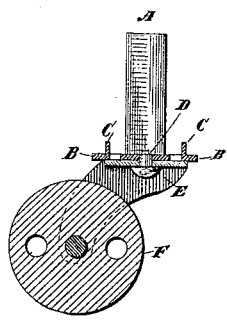

In the accompanying drawings, Figure 1 is a view in perspective of a caster embodying my invention, and Fig. 2 is a view thereof in vertical longitudinal section.

As herein shown, the shank consists of two flexible arms, A A, having straight sides, slightly spread apart at their upper ends, and respectively joining at their lower ends the opposite edges of an oblong plate, B, from the opposite ends of which two points, C C, are cut and bent upward, as shown. The said plate is provided with a pivot, D, upon which a yoke, E, carrying a roller, F, is swiveled, such yoke and roller being of any suitable construction. The said arms are constructed to engage throughout their length with the walls of the socket or hole receiving them, thus forming a rigid connection between the caster and the object to which it is applied, while the friction of such engagement and the binding effect of the effort of the arm to spread apart—they having been sprung together for their introduction into the socket or hole—retains the caster in place without the aid of a metallic thimble, as ordinarily employed. The friction so developed also prevents the shank from turning in the socket or hole. The points or projections upon the upper face of the plate enter the wood and assist friction in holding the caster in place, and in preventing the shank from turning in the said socket or hole. Preferably, the shank and plate will be struck up from a single piece of wrought metal, from which they may be produced with obvious economy.

My invention also effects a great economy in that, so far as the application of my caster to articles of wood is concerned, it dispenses with the metallic thimble which is not required, as my caster holds itself in place.

Through the yielding capacity of the arms of my improved caster, they are conformed to the dimensions of the socket or hole in the wood, and hence splitting of the same is avoided. Moreover, my caster does not call for screw-holes, which weaken and deface the wood. If desired, the shank may be composed of a single arm bowed in cross-section, and obtaining an expansion and contraction between its opposite edges; or it may be made with more than two upright arms like those herein shown; or it may assume other forms adapted for a frictional and tensional engagement throughout its length with the walls of the socket or hole receiving it. I would therefore have it understood that I do not limit myself to the exact construction shown and described, but hold myself at liberty to make such changes and alterations as fairly fall within the spirit and scope of my invention.

I am aware that casters having their spindles provided with bulbous heads longitudinally split to adapt them to spring past the upper end of a metallic thimble are not new. I do not, therefore, broadly claim a spring-spindle; but, Having fully described my invention, what I claim as new, and desire to secure by Letters Patent, is—

1. A caster having a flexible shank adapted to engage throughout its length and under tension with the walls of the socket or hole receiving it, whereby it holds the caster in place and is prevented from turning, substantially as set forth.

2. A caster having a flexible shank made of sheet metal and having straight sides, substantially as set forth.

3. A caster having a flexible shank composed of one or more upright arms made of sheet metal, substantially as set forth.

4. A caster having a shank and a plate made in one piece of sheet metal, substantially as set forth.

5. A caster having a flexible shank and a plate provided upon its upper face with one or more points, substantially as set forth.

6. A caster having a shank composed of two flexible arms, the upper ends of which are spread apart, and a plate provided upon its upper face with two points, such shank and plate being struck up from a single piece of wrought metal, substantially as set forth.

In testimony whereof I have signed this specification in the presence of two subscribing witnesses.

HENRY B. PLUMB.

Witnesses:
FRANCIS C. BOWEN,
JAMES S. EWBANK.